Patented Mar. 18, 1924.

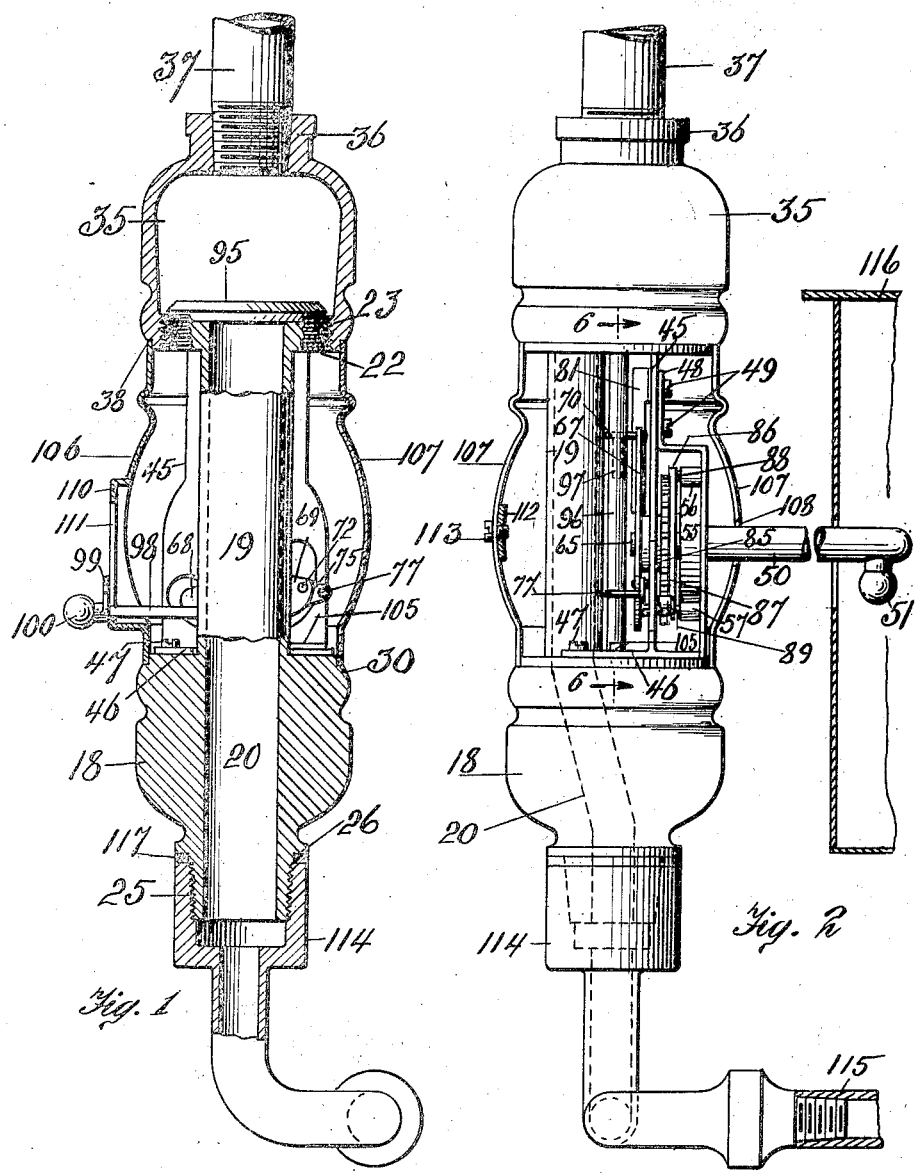

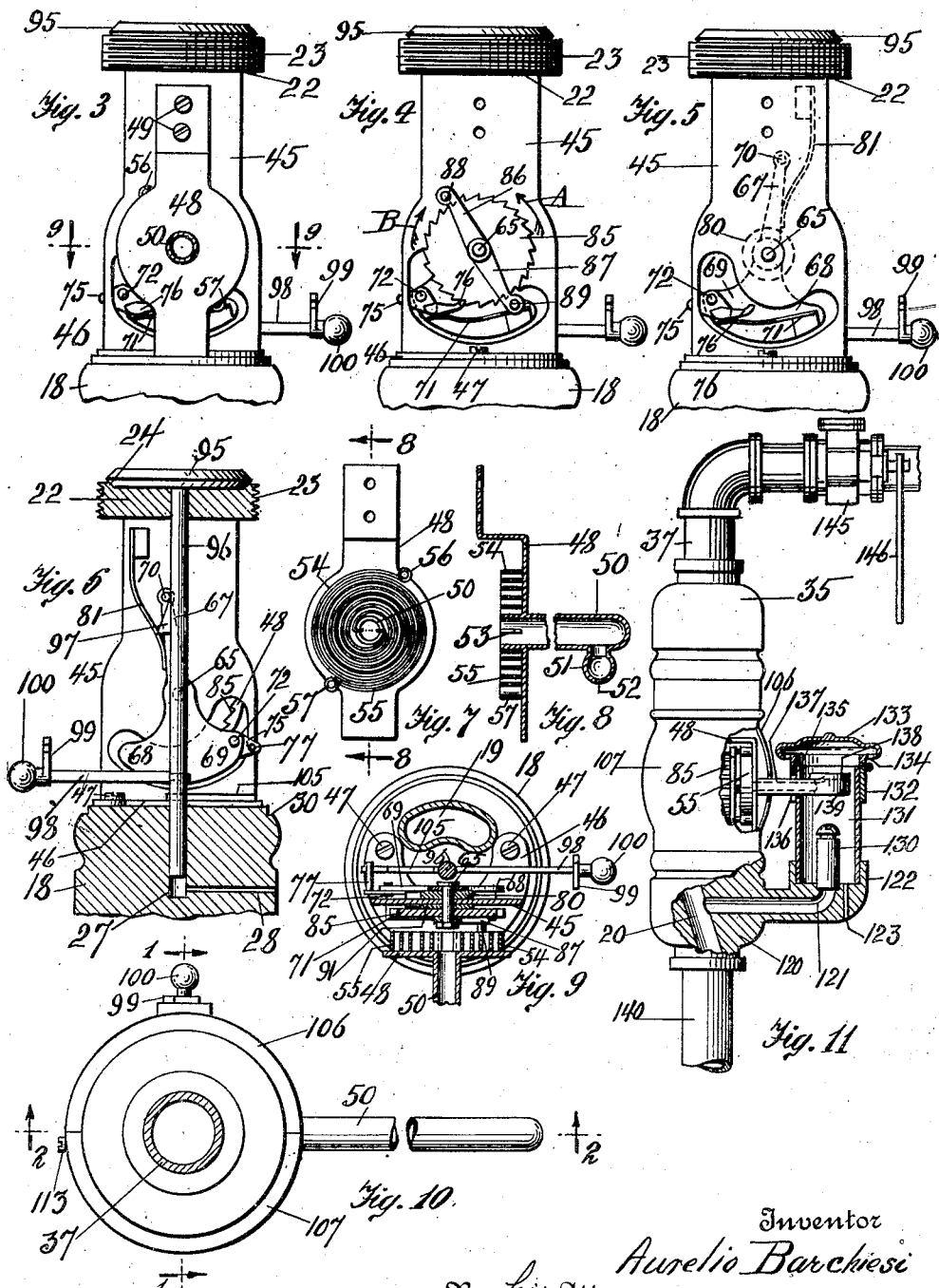

1,487,505

UNITED STATES PATENT OFFICE.

AURELIO BARCHIESI, OF JERSEY CITY, NEW JERSEY, ASSIGNOR OF FORTY ONE-HUN-DREDTHS TO ANGELO BARATTA, TEN ONE-HUNDREDTHS TO ANTONIO OERICO, BOTH OF JERSEY CITY, NEW JERSEY, AND TWENTY ONE-HUNDREDTHS TO GIO-VANNI SQUARCIALUPI, OF NEW YORK, N. Y.

AUTOMATIC VALVE CLOSER.

Application filed April 9, 1921. Serial No. 459,914.

*To all whom it may concern:*

Be it known that I, AURELIO BARCHIESI, a subject of the King of Italy, and resident of Jersey City, in the county of Hudson and State of New Jersey, have invented certain new and useful Improvements in an Automatic Valve Closer, of which the following is a specification.

This invention relates to an automatic valve closer. The object of the invention is the production of a valve closer whereby the flow of gas through a gas pipe is automatically stopped, should the gas flowing from the closer to a burner, become extinguished. The flow of gas is automatically shut off in case the gas is turned off from said burner, or in case the gas is extinguished and still flows, thereby avoiding accidents due to open gas tips that are not lit.

The organization of the invention comprises a conduit having a head for the supply of gas, said head having formed therewith a valve seat. A valve coacts with said seat and is manually raised therefrom and detachably locked in position to maintain said conduit open. A spring or preferably a pair of spiral springs are located in the heat zone of a gas tip, supplied by gas, flowing through the valve closer. A spindle is supported in the closer and carries a lever with a locking pin that locks with the valve stem of the valve to maintain the latter in its open position. The said pin is maintained in its locked position by the expansion of said springs. When the springs cool and contract, the lever is caused to swing and unlock the locking pin from the valve stem, whereby the valve is caused to close on its seat by gravity.

Fig. 1 represents a partial section of Fig. 10 on about the line 1, 1; Fig. 2 shows a partial section of Fig. 10 on the line 2, 2; Fig. 3 is an elevation of the operating elements of the valve closer; Fig. 4 is a view similar to Fig. 3 with some elements eliminated; Fig. 5 is a view similar to Fig. 3 with some more of the elements eliminated; Fig. 6 shows a section of Fig. 2 on the line 6, 6; Fig. 7 represents an elevation of some details; Fig. 8 shows a section of Fig. 7 on the line 8, 8; Fig. 9 represents a section of Fig. 3 on the line 9, 9; Fig. 10 shows a top plan view of the valve closer and Fig. 11 represents an elevation partly in axial section of a modification of the valve closer.

Referring to Figs. 1 to 10, inclusive, the valve closer is represented with a base 18 from which extends the tubular extension 19, that connects with the gas conduit 20 in the base 18. At the upper end of the tubular extension 19 is formed the head 22 exteriorly threaded at 23 and having formed therewith the valve seat 24. At the lower end of the base 18 is formed a threaded shank 25 with a shoulder 26. A guide opening 27 with the vent hole 28 is formed in the base 18. A shoulder 30 is formed at the upper end of the base 18. A valve chamber 35 is in threaded engagement with the head 22 and has formed at its upper end a threaded boss 36 for the gas inlet pipe 37. A shoulder 38 is formed with the lower edge of the valve chamber 35. On the top face of the base 18 is supported a bracket 45 having the foot 46. The said foot is held in place by the screws 47. A spring bracket 48 is fastened at its upper end to the bracket 45, by means of the screws 49 and its lower end bears against said foot 46. A tubular extension 50 with its spherical end 51 having the inlet opening 52 extends from and through the spring bracket 48. Slots like 53 are formed in the tubular extension 50 to support one end each of the spiral springs 54 and 55. The other ends of said springs have formed therewith the eyelets 56 and 57. A spindle 65 is supported in the bracket 45. A lever having the arms 67, 68 and 69 is supported on the spindle 65. A locking pin 70 extends from the other end of said arm 67. On the arm 68 is fastened the leaf spring 71. On the arm 69 is carried a pivot 72 on which is pivoted a lever 75 which latter has formed therewith the pawl 76. A pin 77 extends from the lever 75. A washer 80 on the spindle 65 separates the lever 66 and the bracket 45. A leaf spring 81 has one end fastened to the bracket 45 and its other end bears against the arm 67. A ratchet wheel 85 is loosely supported on the spindle 65. The teeth of the ratchet wheel normally engage with the pawl 76 of the lever 75, by virtue of the tension of the leaf spring 81. A lever with the arms 86 and 87 is fastened to the ratchet wheel 85, and the spindle 65 extends to an opening therethrough. The arm 86 carries at its end a pin 88 which engages the eyelet 56 of the spiral spring 54. The arm 87 carries at its end a pin 89 which engages the eyelet 57 of the spiral spring 55. A washer 91 on the spindle 65 is interposed between the bracket 45 and the ratchet wheel 85. A valve 95 normally seats on the valve seat 24 of the head 22 and has extending therefrom the valve stem 96, which latter has its lower end guided in the guide opening 27 of the base 18. A triangular stop lug 97 is connected to the valve stem 96. An operating arm 98 with the indicator 99 extends from the valve stem 96. A knob 100 is fastened to the outer end of the operating arm 98. An arm 105 extends from the valve stem 96. A detachable spherical shell is located between the shoulders 30 and 38. The shell comprises the shell members 106 and 107 which have formed therewith openings 108 for the tubular extension 50. The member 106 has formed therewith the flat extension 110 having the guide opening 111 for the operating arm 98. The member 106 has a lug 112 and the member 107 is connected to said lug, by means of a screw 113 extending through said member 107 and engaging a threaded opening in the lug 112.

To the threaded shank 25 is connected the outlet fitting 114, which latter has connected thereto the piping 115, that in this instance may be considered leading to a gas burner in a stove 116. A washer 117 is interposed between the shoulder 26 and the top end of the fitting 114.

In the modification indicated in Fig. 11 the base 120, similar to 18, already described, has formed therewith a gas channel 121 leading from the conduit 20, and which terminates in the cup 122 having air openings like 123. A gas tip 130 is threaded in the bore of the gas channel 121. A glass sleeve 131 is supported in the cap 122 and in turn supports the cap 132. A cover 133 with the air openings 134 is hinged to the cap 132. Slots 135 and 136 are respectively formed in the glass sleeve 131 and in the cap 132. A channel 137 with a cap 138 and open at its bottom end 139 extends from the spring bracket 48. This modification is shown with the valve chamber 35, the shell members 106, 107, the gas inlet pipe 37 and their appurtenances as already described. A gas outlet pipe 140 extends from the base 120 and leads from the conduit 20 to the burner of the apparatus to be supplied with gas. In this instance the gas inlet pipe has connected thereto a valve 145 with an operating handle 146 and which latter is automatically operated as will be described.

To operate the valve closer and referring to Figs. 1 and 10, the valve 95 may be considered closed on its valve seat 24, and the operator by lifting the operating arm 98, lifts the valve stem 96 with the valve 95, so that the bottom edge of the stop lug 97 is brought a little above the locking pin 70. Then the arm 105 strikes the pin 77 and the pawl 76 is disengaged from the ratchet wheel 85 and the springs 54 and 55 assume their normal positions due to normal temperatures. Upon the release of the operating arm 98, the stop lug 97 will be locked with the locking pin 70, and the arm 105 will have lowered from the pin 77 and the tension of the spring 71 will again lock the pawl 76 with the ratchet wheel 85. The gas now flows through the valve closer and through piping 115 to the burners of the stove 116. The gas flowing from said burners is now lit and heated air from the stove 116 flows through the opening 52 into the tubular extension 50 and the springs 54 and 55 expand. The expansion of the springs cause the ratchet wheel 85 to turn in the direction of the arrow A, and the pawl 76 by virtue of the tension of the spring 71 remains locked with said ratchet wheel, and the stop lug 97 and the locking pin 70 remain locked. When the gas of the burners of the gas stove 116 is extinguished no heated air flows through the tubular extension 50 and the springs 54 and 55 will contract. This causes the arms 86 and 87 and the ratchet wheel 85 to swing in the direction of the arrow B. The pawl 76 remains locked with the ratchet wheel 85 and swings the lever having the arms 67, 68 and 69 in the direction of the arrow B. When the latter lever swings as just described the pin 70 is disengaged from the triangular stop lug 97 and the valve 95 drops by gravity on its seat 24 to shut off the supply of the gas flowing from the gas inlet pipe 37. Irrespective of the extent of the expansion of the springs 54 and 55 by the heat of the heated air imparted to them by the tubular extension 50, only a small amount of contraction of the springs is necessary to disengage the pin 70 from the lug 97. During the said contraction the pawl 76 remains locked with the ratchet wheel 85. When the operator again lifts the operating arm 98, the arm 105 strikes the pin 77 of the lever 75 and causes the pawl 76 to disengage from the ratchet wheel 85, which allows the springs 54 and 55 to contract to their original positions.

In the modification shown in Fig. 11, as soon as the gas is caused to flow from the gas inlet pipe 37 through the valve closer to the gas outlet pipe 140, the operator lights the gas tip 130, whereby heated air flows through the channel 137 to heat the springs 54 and 55 and maintain the valve 95 open as already described. In this instance the valve closer cooperates with gas burners, the supply of gas of which is automatically controlled by the valve 145. The valve 145 is controlled by automatic means not shown. Should said automatic means close the valve 145, the gas flow from the tip 130 is extinguished. Then should the valve 145 again be opened by said automatic means, gas would flow through the gas burner of the apparatus which would not be lit. But in this instance the automatic valve closer would function, by reason of the contraction of the springs 54 and 55, and the valve 95 would be closed, fully shutting off the supply of gas.

Having described my invention what I desire to secure by Letters Patent and claim is:—

1. In an automatic valve closer of the character described the combination of a valve for a gas conduit of the closer, a valve stem for the valve, a stop lug extending from the valve stem, a spring in the heat zone of a flame fed by gas flowing through the valve closer, a ratchet wheel pivoted in the valve closer connected to one end of said spring and rotated in one direction with the expansion of said spring, a lever pivoted in the valve closer, a locking pin extending from the lever adapted to lock with the stop lug a second lever pivoted to the first lever, a pawl extending from the second lever, a pin extending from the second lever, an operating arm extending from the valve stem to raise it with the valve, and a second arm extending from the valve stem to contact with the pin on the second lever to unlock the pawl from the ratchet wheel to enable the spring to assume its normal position when cooled.

2. In an automatic valve closer of the character described the combination of a gas conduit, a valve for the conduit, a valve stem for the valve, a stop lug extending from the valve stem, a lever pivoted in the closer, a locking pin on the lever, a second lever pivoted to the first lever, a pawl extending from the second lever, a spring on the first lever bearing against said pawl, a ratchet wheel pivoted in the closer, the pawl normally locking with the teeth of the ratchet wheel, a tubular extension for the valve closer with one end in the heat zone of a flame fed by gas flowing through the closer, a spring with one end fastened in the closer and its other end fastened to the ratchet wheel and located to be heated by air flowing through said tubular extension, a pin on the second lever, an operating arm extending from the valve stem to raise it with its valve and a second arm extending from the valve stem to contact with the pin on the second lever when the valve stem is raised.

3. In an automatic valve closer of the character described the combination of a valve for a gas conduit of the closer, a valve stem for the valve, a stop lug extending from the valve stem, means to manually raise the valve stem with its valve, a lever pivoted in the valve closer, a locking pin extending from said lever locking with said stop lug when the valve is located in its raised position, a spring in the heat zone of a flame supplied with gas flowing through the valve closer and expended thereby, and connections between the spring and said lever to maintain said locking pin locked with said stop lug while said spring is expanded, the cooling and consequent contraction of the spring, when said flame is extinguished unlocking said pin from said lug and permitting the said valve to drop to its seat and cutting off the supply of gas through the valve closer.

4. In an automatic valve closer the combination of a valve for a gas conduit therein, a valve stem for the valve, a stop lug extending from the valve stem, an operating arm and a second arm extending from the valve stem, a lever pivoted in the valve closer, a locking pin extending from said lever, locking with said stop lug when the valve is located in its raised position, a second lever pivoted to said lever, a pawl extending from the second lever, a spring extending from the first lever bearing against said pawl, a ratchet wheel journaled in the closer, said pawl normally engaging the teeth of said ratchet wheel, a spring in the heat zone of a flame supplied with gas flowing through said valve closer and expanded thereby and a connection between one end of the spring and said ratchet wheel, said operating arm when raised raising the valve and thereby locking the locking pin with said stop lug, the second arm when in its elevated position disengaging said pawl from said ratchet wheel, the said spring when said flame is extinguished contracting and thereby turning the ratchet wheel, the turning of the ratchet wheel through the intervention of said pawl swinging said lever, to unlock the locking pin from said stop lug, the valve thereby dropping to its seat and closing by gravity to stop the flow of gas through the valve closer.

5. In an automatic valve closer the combination of a base having a gas conduit, a tubular extension extending from the base with its bore connecting with said conduit, a head with valve seat for said extension, a valve chamber connected to said head, a gas inlet pipe for the valve chamber, a valve in said head coacting with said seat, a valve stem extending from said valve, a stop lug extending from the valve stem, a bracket supported on said head, a spindle supported in the bracket, a spring bracket connected to said bracket, a tubular extension extending from and through said spring bracket, the outer end of said extension in the heat zone of a flame supplied with gas flowing through the valve closer, a pair of springs within the spring bracket with one end of each connected to the tubular extension, a ratchet wheel pivoted on the spindle, a lever with two arms supported on the spindle with its arms fastened to the ratchet wheel, the other end of one of said springs connected to one of said arms and the other end of the other spring connected to the other arm, a lever having three arms pivoted on said spindle, a locking pin extending from one of said arms, a second lever pivoted to the second arm of the first lever, a pin extending from said second lever, a pawl extending from the second lever adapted to lock with the teeth of the ratchet wheel, a spring with one end fastened to the third arm of the first lever and its free end bearing against said pawl to normally lock it with the teeth of the ratchet wheel, a spring bearing against the lever having the three arms to force the locking pin on one of its arms against said valve stem, an operating arm extending from the valve stem to manually raise it with its valve and a second arm extending from the valve stem to engage the pin on the lever having the pawl when the valve is raised by the operating lever, the said second arm when contacting with the latter pin disengaging the pawl from the ratchet wheel.

6. In an automatic valve closer of the character described the combination of a valve for a gas conduit therein, means to manually raise the valve from its seat, locking means to detachably lock the valve in its raised position, a gas channel extending from said gas conduit, a gas tip for said channel, a spring in the heat zone of the flame of said gas tip, connections between the spring and said locking means, the heat of the heat zone expanding the spring and thereby maintaining the locking means in their locked position, an automatically operated valve connected to the gas inlet pipe of the valve closer, said valve when closed extinguishing the flame of said gas tip, thereby cooling the spring of the valve closer, contracting the same, and the connections between the spring and the locking means unlocking and enabling the valve of the closer to close by gravity.

Signed at Jersey City, in the county of Hudson and State of New Jersey this 7th day of April A. D. 1921.

AURELIO BARCHIESI.